(Model.)

L. WALLACE.
SICKLE BAR AND KNIFE.

No. 294,099. Patented Feb. 26, 1884.

WITNESSES:

INVENTOR:
L. Wallace
BY
ATTORNEYS.

UNITED STATES PATENT OFFICE.

LORENZO WALLACE, OF KANSAS CITY, MISSOURI.

SICKLE BAR AND KNIFE.

SPECIFICATION forming part of Letters Patent No. 294,099, dated February 26, 1884.

Application filed June 5, 1883. (Model.)

*To all whom it may concern:*

Be it known that I, LORENZO WALLACE, of Kansas City, in the county of Jackson and State of Missouri, have invented a new and Improved Sickle Bar and Knife, of which the following is a full, clear, and exact description.

The object of my invention is to provide for attachment of the knives for cutters to sickle-bars by simple and efficient means that will allow the convenient placing and the removal of the knives.

Reference is to be had to the accompanying drawings, forming a part of this specification, in which similar letters of reference indicate corresponding parts in all the figures.

Figure 1:
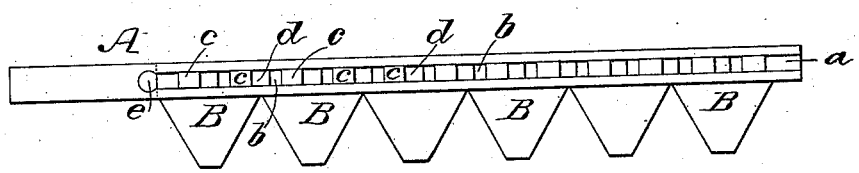
Figure 2:
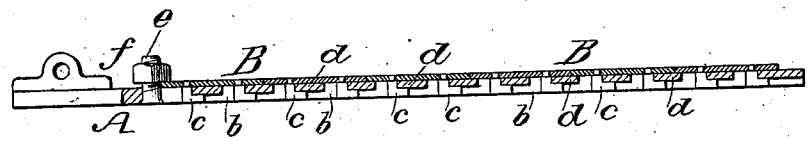
Figure 3:
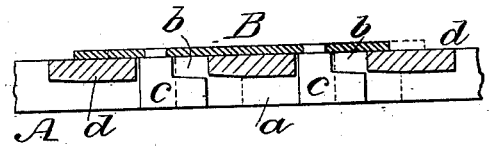
Figure 4:
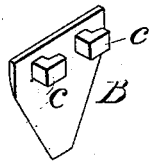

Figure 1 is an inverted plan view of a sickle bar and knives of my improved construction. Fig. 2 is a longitudinal section of the same. Fig. 3 is a detail section in larger size, and Fig. 4 is a perspective view of one of the knives.

A is the sickle or cutter bar, and B B the knife-sections attached to the bar. The bar A is formed with a groove, a, of suitable depth on one side, and with slots or apertures b at regular intervals in the bottom of the groove, there being preferably two slots b in the width of each knife-section. The sections B are provided with lugs c c, of hook form, or shouldered at their outer ends, to take beneath the cross-bars d, or solid portions dividing the slots b. The lugs or hooks c are preferably beveled, as shown most clearly in Fig. 3, and the cross-bars d correspondingly beveled, so that when the sections are moved up to place the lugs shall wedge tightly. The end one of the sections B is held so as to lock all the others securely by a screw-pin, e, fixed in bar A, and a nut, f, which, being screwed down, prevents the section from rising, while the pin e prevents side movement; and the pin is preferably flattened on one side to give a good bearing for the knife-sections. The knife-sections are to be put in place in succession, commencing at the outer end of bar A, by passing the lugs c through the slots b, and then sliding the sections sidewise to engage the lugs, and the last one is secured by the pin e and nut f. Any other suitable device may, however, be used to secure the last section. The lugs c are formed, as shown in Fig. 3, with shouldered ends that serve as rivets to secure the lugs to the sections. This fastening device is simple, inexpensive, and substantial, and permits the ready attachment or the disconnection of the knives.

Having thus fully described my invention, I claim as new and desire to secure by Letters Patent—

The sickle-bar A, having groove a on one side, apertures b in the bottom of said groove, and the cross-bars d, in combination with cutter-sections B, having the hook-shaped lugs c, the screw-pin e, and the nut f, as shown and described.

LORENZO WALLACE.

Witnesses:
FRED ALONZO MILLER,
JAMES VAN PEYMA.